(12) United States Patent
Tian et al.

(10) Patent No.: US 10,208,887 B2
(45) Date of Patent: Feb. 19, 2019

(54) GIMBAL HANDHELD HOLDER

(71) Applicant: YUNEEC TECHNOLOGY CO., LIMITED, Hong Kong (CN)

(72) Inventors: Yu Tian, Jiangsu (CN); Wenyan Jiang, Jiangsu (CN)

(73) Assignee: YUNEEC TECHNOLOGY CO., LIMITED, Hong Kong (CN)

( * ) Notice: Subject to any disclaimer, the term of this patent is extended or adjusted under 35 U.S.C. 154(b) by 0 days.

(21) Appl. No.: 15/549,984

(22) PCT Filed: Apr. 12, 2016

(86) PCT No.: PCT/CN2016/079045
§ 371 (c)(1),
(2) Date: Aug. 9, 2017

(87) PCT Pub. No.: WO2016/165605
PCT Pub. Date: Oct. 20, 2016

(65) Prior Publication Data
US 2018/0023752 A1 Jan. 25, 2018

(30) Foreign Application Priority Data

Apr. 13, 2015 (CN) .......................... 2015 1 0172556
Apr. 13, 2015 (CN) ..................... 2015 2 0219738 U

(51) Int. Cl.
F16M 11/18 (2006.01)
H04N 5/225 (2006.01)
H04N 5/232 (2006.01)
F16M 11/12 (2006.01)
F16M 13/04 (2006.01)

(52) U.S. Cl.
CPC ........... *F16M 11/18* (2013.01); *F16M 11/123* (2013.01); *F16M 13/04* (2013.01); *H04N 5/2252* (2013.01); *H04N 5/23296* (2013.01)

(58) Field of Classification Search
CPC .. H04N 5/23296; H04N 5/2252; F16M 11/18; F16M 11/123; F16M 13/04
See application file for complete search history.

(56) References Cited

U.S. PATENT DOCUMENTS 8,861,947 B2 * 10/2014 Webb .................. H04N 5/2328
396/55
9,458,963 B1 * 10/2016 Choi .................... F16M 13/022
(Continued)

FOREIGN PATENT DOCUMENTS

CN 203940203 U 11/2014

Primary Examiner — Luong T Nguyen

(57) ABSTRACT

A gimbal handheld holder includes two support legs and a control device. A transverse rod is located between the two support legs. A handle is located on the transverse rod. A gimbal connector is located at a junction of the handle with the transverse rod. The gimbal handheld holder is connected with a gimbal through the gimbal connector. The gimbal is located below the transverse rod and between the two support legs. The handle is located on the transverse rod. The control device controls the gimbal to move. The gimbal handheld holder is able to achieve force balance at two ends thereof, and steadily hold the gimbal below the transverse rod. While being connected with the gimbal, the gimbal handheld holder is able to be directly steadily placed on ground.

14 Claims, 5 Drawing Sheets

(56) References Cited

U.S. PATENT DOCUMENTS

2013/0321656 A1* 12/2013 Ducharme ......... H04N 5/23203
    348/211.1
2014/0099092 A1* 4/2014 Di Leo ................ G03B 17/563
    396/420

* cited by examiner

GIMBAL HANDHELD HOLDER

CROSS REFERENCE OF RELATED APPLICATION

This is a U.S. National Stage under 35 U.S.C 371 of the International Application PCT/CN2016/079045, filed Apr. 12, 2016, which claims priority under 35 U.S.C. 119(a-d) to CN 201510172556.3, filed Apr. 13, 2015; and CN 201520219738.7, filed Apr. 13, 2015. All contents of the priority document are included into this application by reference.

BACKGROUND OF THE PRESENT INVENTION

Field of Invention

The present invention relates to a gimbal handheld holder.

Description of Related Arts

Existing handheld gimbals are only hand-held and unable to be controlled. A camera is placed on the gimbal, so it is required for a control device to control the gimbal for achieving shooting without a dead angle, so as to accurately adjust the photographing angle. Moreover, no support portion is provided in the existing handheld gimbals, so that the handheld gimbals are unable to be placed on ground or a plane while being connected, thus the usage and the installation are inconvenient.

SUMMARY OF THE PRESENT INVENTION

A technical problem to be solved of the present invention is to provide a gimbal handheld holder which is able to overcome deficiencies that existing handheld gimbals are inconvenient in usage and installation.

The present invention solves the above technical problem through technical solutions as follows.

A gimbal handheld holder comprises two support legs and a control device, wherein a transverse rod is located between the two support legs, a handle is located on the transverse rod, a gimbal connector is located at a junction of the handle with the transverse rod, the gimbal handheld holder is connected with a gimbal through the gimbal connector, the gimbal is located below the transverse rod and between the two support legs, the handle is located on the transverse rod, and the control device controls the gimbal to move.

In this technical solution, the two support legs are able to achieve force balance at two ends of the gimbal handheld holder, and steadily hold the gimbal below the transverse rod, and especially for the gimbal with larger volume and weight, the support effect of this embodiment is better; while being connected with the gimbal, the gimbal handheld holder is able to be directly steadily placed on ground, which is convenient for installation. Moreover, the handle, located on the transverse rod, allows a user to facilitate holding the gimbal handheld holder, thereby enhancing use convenience. Furthermore, the handle is able to be arbitrary in shape, and as long as be easily held. The control device of the gimbal handheld holder is able to further control the gimbal to rotate, so as to improve control flexibility for the gimbal.

Preferably, the control device comprises a handheld holder main control board and at least one rocker potentiometer; the handheld holder main control board is located within the handle; the rocker potentiometer, located on one of the two support legs, receives operation instructions and sends electrical signals to the handheld holder main control board; the handheld holder main control board converts the electrical signals into PWM (pulse width modulation) signals and sends the PWM signals to a main control board of the gimbal; and the main control board controls the gimbal to rotate according to the PWM signals.

For the rocker potentiometer, different operation directions and distances produce different electrical signals which are performed an analog-to-digital conversion; the handheld holder main control board samples the electrical signals and sets corresponding sample values, so that the electrical signals are converted into impulse signals with different high level times which are able to control the gimbal to rotate, so as to adjust a rotation direction and amplitude of the gimbal.

Preferably, an amount of the rocker potentiometer is one, and the main control board controls the gimbal to rotate in two axis directions perpendicular to each other according to the PWM signals.

When one rocker potentiometer receives the operation instructions in two directions, the gimbal rotates in two axis directions which are perpendicular to each other, so that one rocker potentiometer is used to save development costs and simplify circuit control structure.

Preferably, an amount of the rock potentiometers is two; the two rock potentiometers are respectively located on the two support legs; one of the two rock potentiometers receives a first operation instruction and sends a first electrical signal to the handheld holder main control board, the other of the two rock potentiometers receives a second operation instruction and sends a second electrical signal to the handheld holder main control board; the handheld holder main control board respectively converts the first operation instruction and the second operation instruction into a first PWM signal and a second PWM signal, and then respectively sends the first PWM signal and the second PWM signal to the main control board of the gimbal; the gimbal controls the gimbal to rotate in a first axis direction according to the first PWM signal, and to rotate in a second axis direction perpendicular to the first axis direction according to the second PWM signal.

Two rock potentiometers are used to achieve that the gimbal rotates in two axis directions which are perpendicular to each other; on the one hand, the operation wear of a single rock potentiometer is reduced, on the other hand, a complexity of a mechanical structure that excess rock potentiometers are located on one support leg is also decreased. Moreover, the gimbal is able to selectively rotate in only one axis direction; without changing the circuit structure, only through toggling one of the two rock potentiometers to a position where the gimbal is unable to rotate.

Preferably, the control device comprises a handheld holder main control board and a roller; the handheld holder main control board is located within the handle; the roller, located on the handle, receives an operation instruction and sends an electrical signal to the handheld holder main control board; the handheld holder main control board sends a PWM (pulse width modulation) signal to a main control board of the gimbal after receiving the electrical signal; and the main control board controls the gimbal to rotate in an axis direction according to the PWM signal.

Through the roller, the gimbal rotates in one axis direction, which is different from the rock potentiometer in that: the gimbal rotates only through toggling the roller on the handle by a user, which is more convenient for operation.

Preferably, the control device comprises a handheld holder main control board, at least one rock potentiometer, a roller and a first switch; the handheld holder main control board is located within the handle; the rock potentiometer is located on one of the two support legs; the roller and the first switch are located on the handle; and the first switch allows the handheld holder main control board to switch between a way of controlling the gimbal to rotate through the roller and a way of controlling the gimbal to rotate through the rock potentiometer.

In this technical solution, the gimbal rotates through the rock potentiometer as above; the gimbal rotates in two axis directions which are perpendicular to each other through one rock potentiometer and also through two rock potentiometers, or the gimbal rotates in one axis direction through selectively using one rock potentiometer. However, the axis direction based on controlling the gimbal to rotate through the roller and the axis direction based on controlling the gimbal to rotate through the rock potentiometer are able to be same or different, and however, it is unable to simultaneously allow the gimbal to rotate in more directions; when the above two ways coexist, the control flexibility is further enhanced.

Preferably, the control device further comprises a second switch, wherein the second switch is electrically connected with the handheld holder main control board and is adapted for allowing the rocker potentiometer to switch between a global mode and a follow mode, the global mode means that a camera device on the gimbal does not rotate as a holder rotates, and the follow mode means that the camera device on the gimbal rotates as the holder rotates.

Under the way that the gimbal rotates through the rock potentiometer, the second switch is able to further allow a state of a camera on the gimbal to meet a user demand. Under the follow mode, the rock potentiometer is unable to control the camera on the gimbal to rotate.

Preferably, the rocker potentiometer and a second switch are located on a same PCB (printed circuit board).

Preferably, the gimbal handheld holder further comprises a gimbal plug board, wherein the gimbal plug board is located within the handle, and the handheld holder main control board is electrically connected with the main control board of the gimbal through the gimbal plug board.

Preferably, the handheld holder main control board converts the electrical signal into the PWM signal through filtering and angle conversion.

Also, the present invention provides a gimbal system which comprises the above-mentioned gimbal handheld holder and the gimbal.

Positive progress effects of the present invention of the present invention are as follows. The present invention achieve force balance at two ends of the gimbal handheld holder, and steadily holds the gimbal below the transverse rod, and especially for the gimbal with larger volume and weight, the support effect of the present invention is better; while being connected with the gimbal, the gimbal handheld holder is able to be directly steadily placed on ground, which is convenient for installation. Moreover, the handle, located on the transverse rod, enhances use convenience. Furthermore, the control device of the gimbal handheld holder adopts different control ways to improve the control flexibility for the gimbal.

DETAILED DESCRIPTION OF THE PREFERRED EMBODIMENT

First Embodiment

Figure 1:
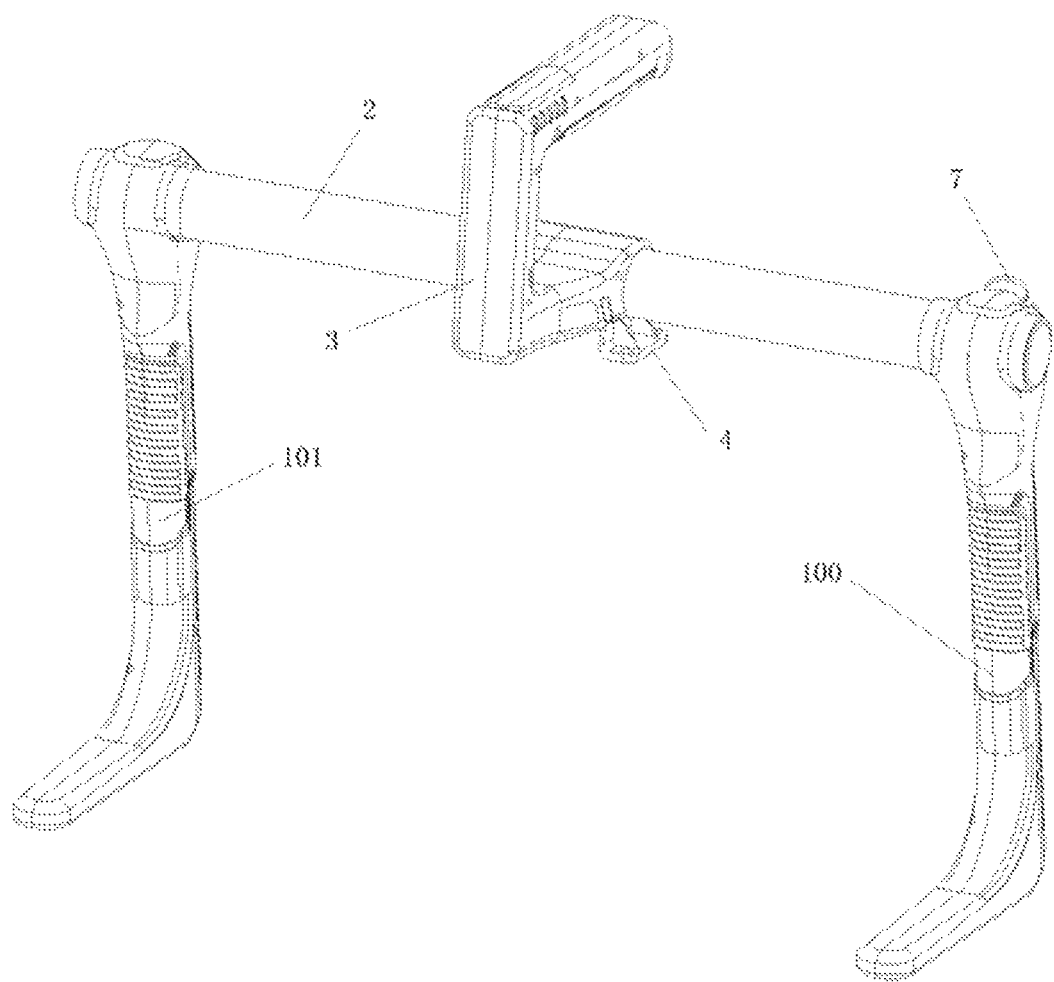
FIG. 1 is a structurally schematic view of a gimbal handheld holder according to a first preferred embodiment of the present invention.
Figure 2:
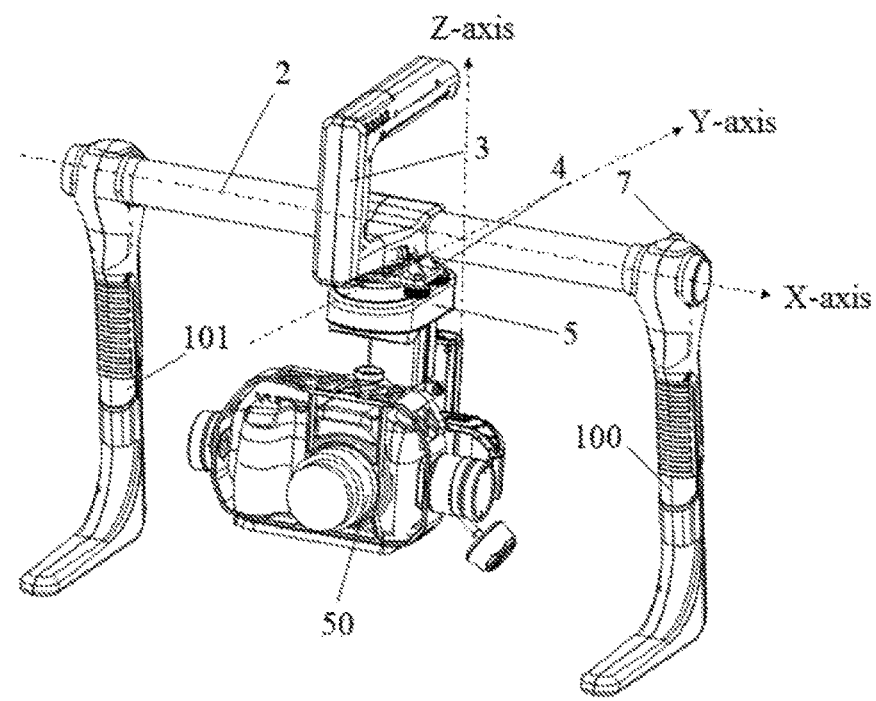
FIG. 2 is a structurally schematic view of the gimbal handheld holder assembled with a gimbal according to the first preferred embodiment of the present invention.
Figure 3:
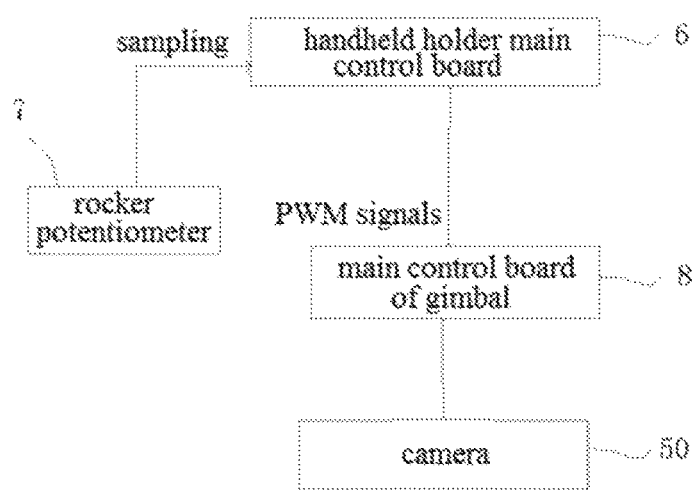
FIG. 3 is a structurally schematic view of a control device of the gimbal handheld holder according to the first preferred embodiment of the present invention.

This embodiment provides a gimbal handheld holder, as shown FIGS. 1-3, which comprises two support legs 100, 101 and a control device, wherein a transverse rod 2 is located between the two support legs 100, 101; a handle 3 is located on the transverse rod 2; a gimbal connector 4 is located at a junction of the handle 3 with the transverse rod 2; the gimbal handheld holder is connected with a gimbal 5 through the gimbal connector 4; the gimbal 5 is located below the transverse rod 2 and between the two support legs 100, 101; the handle 3 is located on the transverse rod 2; and the control device is adapted for controlling the gimbal 5 to move.

A camera device is located on the gimbal, such as a vidicon or a camera, which is able to capture pictures. In this embodiment, a camera 50 is located on the gimbal. The control device comprises a handheld holder main control board 6 and a rocker potentiometer 7, wherein the handheld holder main control board 6 is located within the handle 3; in this embodiment, the rocker potentiometer 7 is located on the left support leg 100, referring to FIG. 1, and is adapted for receiving operation instructions and sending electrical signals to the handheld holder main control board 6; the handheld holder main control board is adapted for converting the electrical signals into PWM (Pulse Width Modulation) signals, and sending the PWM signals to a main control board 8 of the gimbal 5; the main control board 8 controls the gimbal 5 to rotate according to the PWM signals.

In the embodiment, while being operated at a left-right direction, the rocker potentiometer 7 controls a yaw direction of the gimbal, so as to allow the gimbal to rotate around a Y-axis, for defining a yaw angle; that is, the gimbal rotates clockwise or counterclockwise in a horizontal direction, a camera lens of a corresponding camera rotatably shoots in the horizontal direction. During the actual control, the electrical signals of the rocker potentiometer 7 are sampled, and an amount of the samples is in a range of 0-1023. Through filtering and angle conversion, the handheld holder main control board 6 obtains the PWM signals with the high level time of 1-2 ms and sends the PWM signals to the main control board 8 of the gimbal 5 through an I/O port, and the main control board 8 controls the gimbal 5 to rotate clockwise or counterclockwise in the horizontal direction.

This embodiment is able to achieve force balance at two ends of the gimbal handheld holder, and steadily holds the gimbal below the transverse rod. While being connected with the gimbal, the gimbal handheld holder is able to be directly steadily placed on ground. The gimbal rotates clockwise or anticlockwise in the horizontal direction through a left and right remote control of the rocker potentiometer.

Second Embodiment

Figure 4:
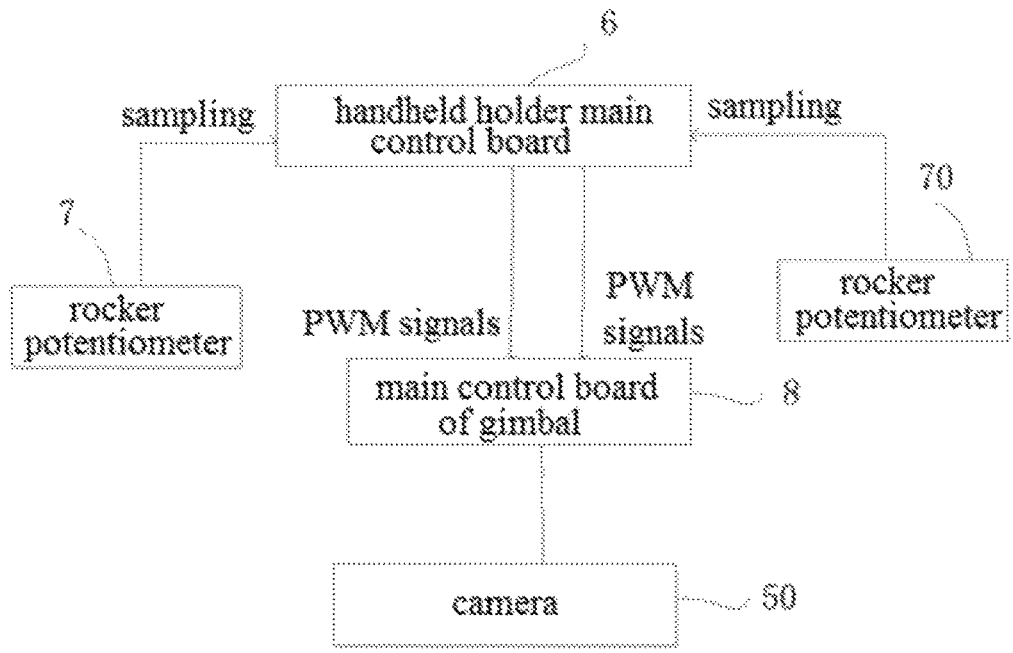
FIG. 4 is a structurally schematic view of a control device of a gimbal handheld holder according to a second preferred embodiment of the present invention.

This embodiment provides a gimbal handheld holder, as shown in FIG. 4, which is different from the first embodiment as follows. In this embodiment, the gimbal handheld holder further comprises another rocker potentiometer 70 located on the right support leg 101, wherein the rocker potentiometer 70 controls a pitch direction of the gimbal, in such a manner that the gimbal rotates around X-axis, which defines a pitch angle, that is, the gimbal rotates clockwise or anticlockwise in a direction perpendicular to a horizontal plane, and the lens of the corresponding camera rotatably shoots upwardly or downwardly in the direction perpendicular to the horizontal plane.

In actual control, electrical signals of the rocker potentiometer 70 are sampled, wherein an amount of samples is in a range of 0-1023. Through the way of filtering and angle conversion, the handheld holder main control board 6 obtains the PWM signals with a high level time of 1-2 ms. In this embodiment, 1023 sample values are set to correspond to 120-degree wide-angle shooting of the camera; of course, the shooting range is not limited to the above description and is able to achieve 360-degree shooting in the above direction. In this embodiment, while 120-degree wide-angle shooting, one sample value is corresponding to 120/1023-degree, one-degree is corresponding to 1023/120 sample values, so through an internal preset angle equation of: angle value=45+(pulse signal−1500)*scale, here, the scale is set to 0.153 based on experience, a corresponding pulse signal is obtained according to an angle that needs to be rotated and is converted into a PWM signal with a high level time of 1-2 ms; the PWM signal is sent to the main control board 8 of the gimbal 5 through an I/O port, and the main control board 8 controls the gimbal 5 to rotatably shoot upwardly or downwardly in a direction perpendicular to a horizontal plane. Factually, the angle equation is limited to be the above, any equivalent transformation of the angle equation, such as linear or superimposed transformation for improving rotation accuracy and rotation amplitude, falls within the protective scope of the present invention.

The present embodiment achieves the effect of the first embodiment, and meanwhile, the present embodiment is able to perform the rotation control in more directions, thus further enhancing the control flexibility. When it is necessary for the gimbal to switch control in the yaw or pitch direction, the other rocker positioner is toggled to a position where the gimbal is unable to rotate.

Third Embodiment

Figure 5:
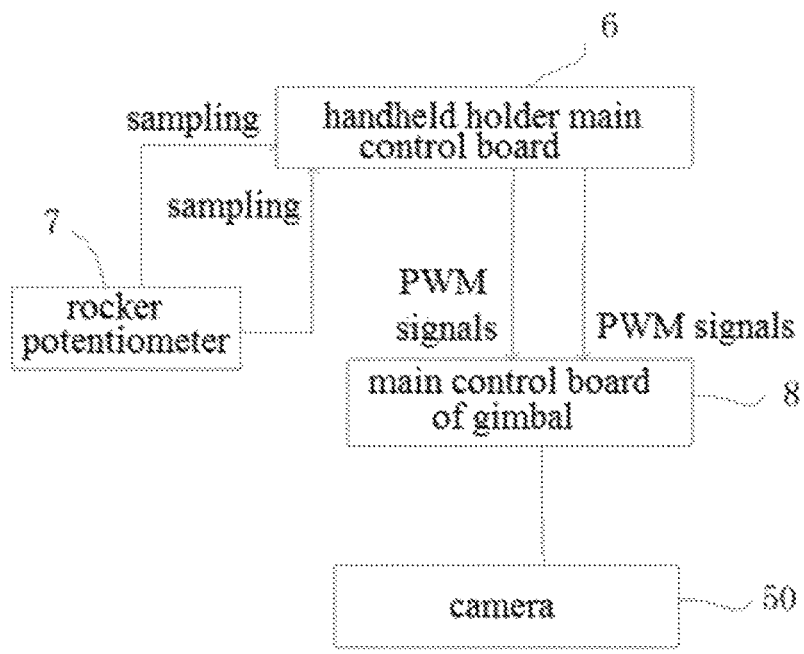
FIG. 5 is a structurally schematic view of a control device of a gimbal handheld holder according to a third preferred embodiment of the present invention.

This embodiment provides a gimbal handheld holder, as shown in FIG. 5, which is different from the first embodiment as follows. In this embodiment, the rocker potentiometer 7 is also able to control a pitch direction of the gimbal, a control principle is same as the second embodiment, that is to say, two electrical signals of the rocker potentiometer 7 are sampled, which comprises an electrical signal for controlling the yaw direction and an electrical signal for controlling the pitch direction, the handheld holder main control board 6 finally sends two PWM signals to the main control board 8 of the gimbal 5, so as to achieve the rotation of the gimbal in the yaw and pitch directions. In actual operation, the rocker potentiometer 7 is operated up and down to control the pitch direction of the gimbal, namely, in this embodiment, the functions of controlling the gimbal to rotate in two directions are centered on one rocker potentiometer 7, thus saving development costs and simplifying circuit control structure.

Fourth Embodiment

Figure 6:
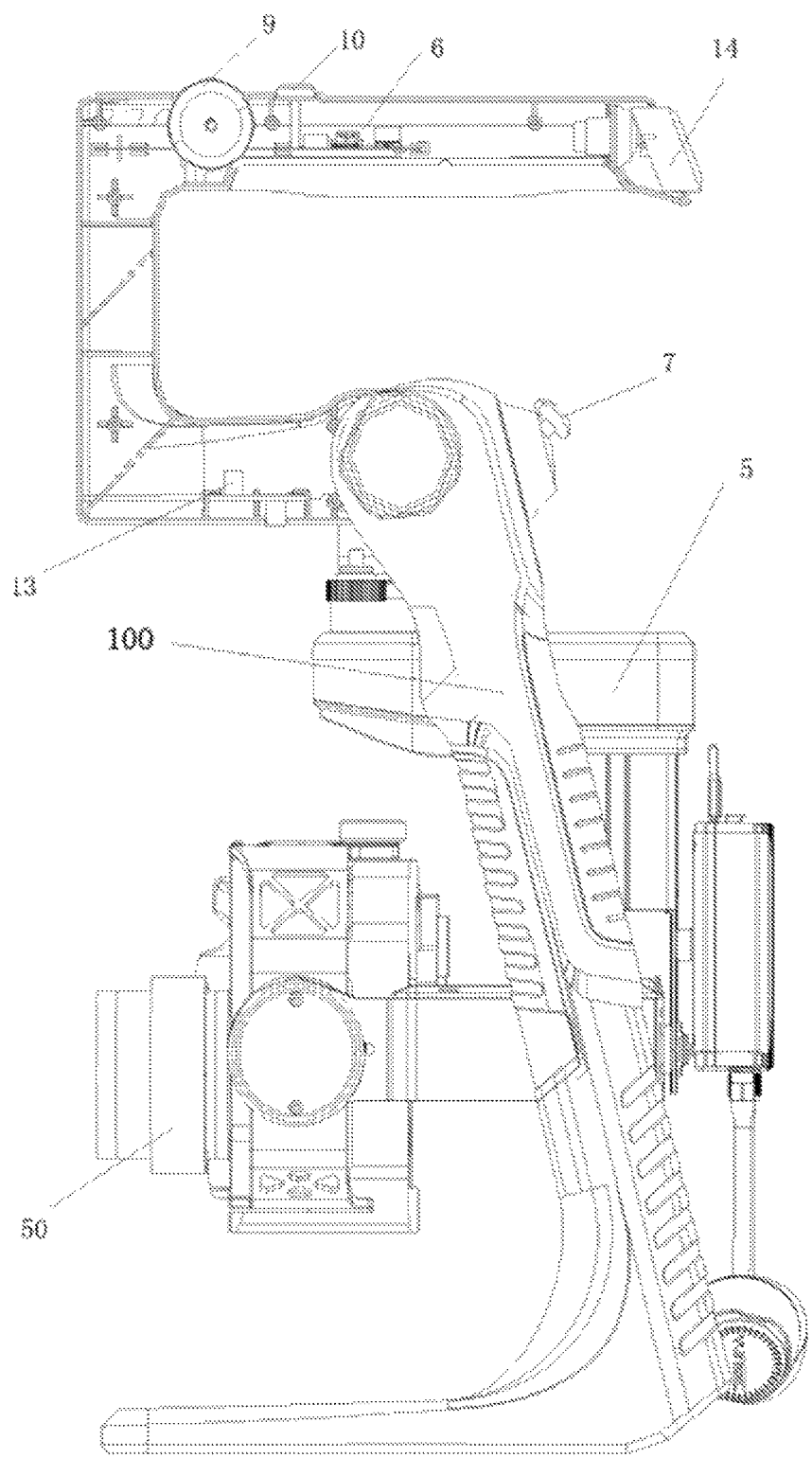
FIG. 6 is a partially sectional view of FIG. 2 according to a fourth preferred embodiment of the present invention.
Figure 7:
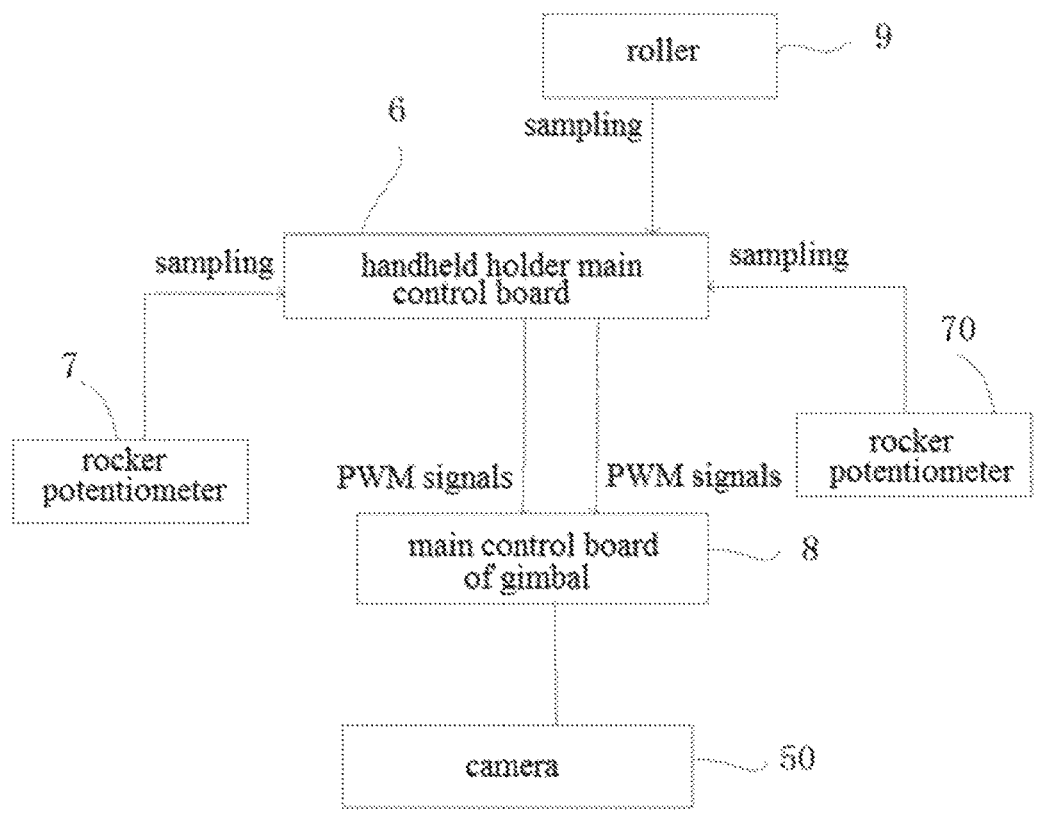
FIG. 7 is a structurally schematic view of a control device of a gimbal handheld holder according to the fourth preferred embodiment of the present invention.

This embodiment provides a gimbal handheld holder, as shown in FIGS. 6-7. In order to express the structure on the handle, along the direction of the right side view of FIG. 2, FIG. 6 shows the partially sectional view of the handle to make the roller, the first switch and the handheld holder main control board visible. Differences between this embodiment and the second embodiment are as follows. In this embodiment, the gimbal handheld holder further comprises a roller 9 and a first switch 10, wherein the roller 9 and the first switch 10 are located on the handle 3, the first switch 10 is adapted for allowing the handheld holder main control board 6 to switch between the way of controlling the gimbal to rotate through the roller and the way of controlling the gimbal 5 to rotate through the rocker potentiometer 7.

The roller is able to control the gimbal to rotate in any one of yaw direction, pitch direction and roll direction, wherein the roll direction is adapted for rotating the gimbal around Z-axis, which defines a flip angle, that is, the gimbal rotates inwardly clockwise or outwardly anticlockwise in a direction perpendicular to a horizontal plane, and a lens of a corresponding camera shoots rotatably inwardly or outwardly in the direction perpendicular to the horizontal plane.

This embodiment adopts the roller and the rocker potentiometer 7 to control the gimbal to rotate, so that this embodiment achieves the effect of the second embodiment, and meanwhile, enhances the control flexibility for the gimbal.

Fifth Embodiment

Figure 8:
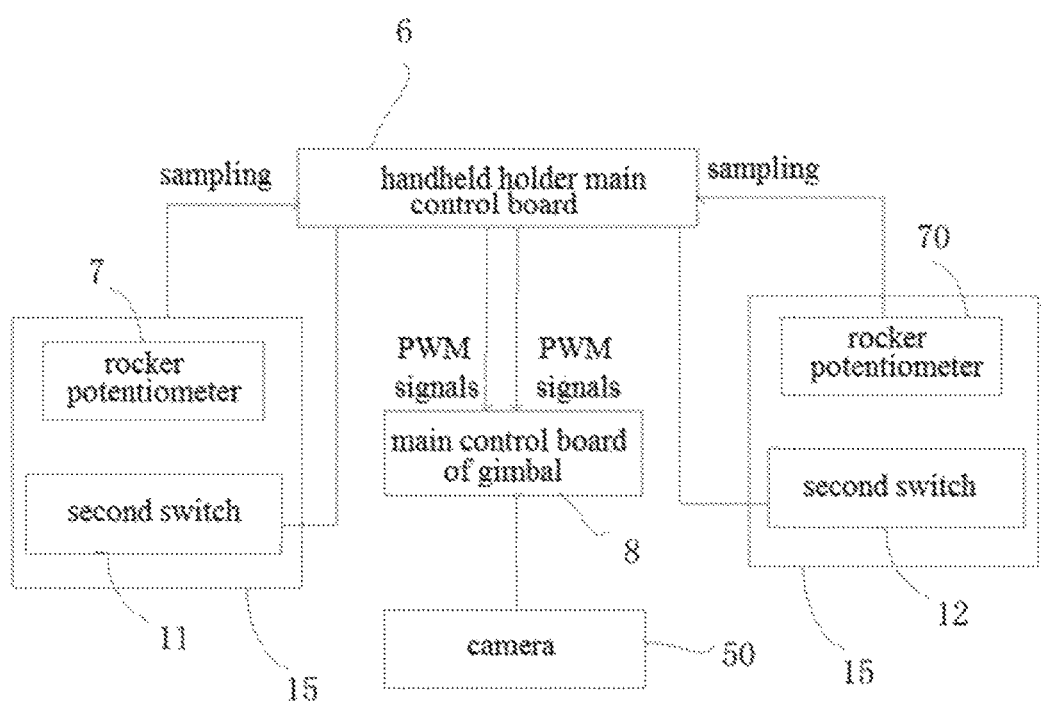
FIG. 8 is a structurally schematic view of a control device of a gimbal handheld holder according to a fifth preferred embodiment of the present invention.

This embodiment provides a gimbal handheld holder, as shown in FIG. 6, wherein a control device of the gimbal handheld holder is shown in FIG. 8. Differences between this embodiment and the second embodiment are as follows. The control device comprises second switches 11, 12, wherein the second switches 11, 12 are electrically connected with the handheld holder main control board 6 and are adapted for respectively allowing the rocker potentiometers 7, 70 to switching between a global mode and a follow mode, the global mode means that the camera device on the gimbal does not rotate as a holder rotates, and the follow mode means that the camera device on the gimbal rotates as the holder rotates.

The rocker potentiometer 7 and the second switch 11 are located on a PCB (Printed Circuit Board), and the rocker potentiometer 70 and the second switch 12 are located on another PCB 15. When the electrical signals of the rocker potentiometers are converted into the PWM signals with the high level time of 1-2 ms, the system enters the global mode; when the electrical signals of the rocker potentiometers are converted into the PWM signals with the high level time of 2-3 ms, the system enters the follow mode. Different rocker potentiometers in the second embodiment respectively control different rotation directions, so under the global mode, the gimbal is able to be kept on this mode in the direction, and is also uniformly controlled, which is determined as required.

Moreover, the gimbal handheld holder further comprises a gimbal plug board 13 and a main switch 14, wherein the gimbal plug board 13 is located within the handle, the handheld holder main control board is electrically connected with the main control board 8 of the gimbal, and the main switch 14 is adapted for providing the whole gimbal handheld holder with power-on/off.

This embodiment adopts the second switches 11, 12 to further allow the state of the camera on the gimbal to meet demands of users, so that this embodiment achieves the effect of the second embodiment, and meanwhile, is able to enhance the control flexibility.

The directions controlled by the rocker potentiometer are not limited to the above-described embodiments, and the rocker potentiometer is also able to rotate the gimbal in any one of the yaw direction. Moreover, the first, second, third, fourth, fifth and sixth embodiments are able to be arbitrarily combined in a mutually inconsistent manner to achieve the effect that the gimbal is flexibly controlled to rotate in multiple directions, and these arbitrary combinations fall within the protective scope of the present invention.

What is claimed is:

1. A gimbal handheld holder, comprising two support legs and a control device, wherein:
   a transverse rod is located between the two support legs, a handle is located on the transverse rod, a gimbal connector is located at a junction of the handle with the transverse rod, the gimbal connector is configured to connect the gimbal handheld holder with a gimbal, and the control device controls the gimbal to move;
   the control device comprises a handheld holder main control board and at least one rocker potentiometer; the handheld holder main control board is located within the handle; the at least one rocker potentiometer, located on one of the two support legs, receives operation instructions and sends electrical signals to the handheld holder main control board; the handheld holder main control board converts the electrical signals into PWM (pulse width modulation) signals and sends the PWM signals to a main control board of the gimbal; and the main control board controls the gimbal to rotate according to the PWM signals.

2. The gimbal handheld holder, as recited in claim 1, wherein an amount of the at least one rocker potentiometer is one, the main control board controls the gimbal to rotate in two axis directions perpendicular to each other according to the PWM signals.

3. The gimbal handheld holder, as recited in claim 1, wherein an amount of the at least one rocker potentiometer is two; the two rocker potentiometers are respectively located on the two support legs; one of the two rocker potentiometers receives a first operation instruction and sends a first electrical signal to the handheld holder main control board, the other of the two rocker potentiometers receives a second operation instruction and sends a second electrical signal to the handheld holder main control board; the handheld holder main control board respectively converts the first operation instruction and the second operation instruction into a first PWM signal and a second PWM signal, and then respectively sends the first PWM signal and the second PWM signal to the main control board of the gimbal; the main control board of the gimbal controls the gimbal to rotate in a first axis direction according to the first PWM signal, and to rotate in a second axis direction perpendicular to the first axis direction according to the second PWM signal.

4. A gimbal handheld holder, comprising two support legs and a control device, wherein:
   a transverse rod is located between the two support legs, a handle is located on the transverse rod, a gimbal connector is located at a junction of the handle with the transverse rod, the gimbal connector is configured to connect the gimbal handheld holder with a gimbal, and the control device controls the gimbal to move;
   the control device comprises a handheld holder main control board and a roller; the handheld holder main control board is located within the handle; the roller, located on the handle, receives an operation instruction and sends an electrical signal to the handheld holder main control board; the handheld holder main control board sends a PWM (pulse width modulation) signal to a main control board of the gimbal after receiving the electrical signal; and the main control board controls the gimbal to rotate in an axis direction according to the PWM signal.

5. The gimbal handheld holder, as recited in claim 1, wherein the at least one rocker potentiometer switches between a global mode and a follow mode, the global mode means that a camera device on the gimbal does not rotate as a holder rotates, and the follow mode means that the camera device on the gimbal rotates as the holder rotates.

6. The gimbal handheld holder, as recited in claim 2, wherein the at least one rocker potentiometer switches between a global mode and a follow mode, the global mode means that a camera device on the gimbal does not rotate as a holder rotates, and the follow mode means that the camera device on the gimbal rotates as the holder rotates.

7. The gimbal handheld holder, as recited in claim 3, wherein the at least one rocker potentiometer switches between a global mode and a follow mode, the global mode means that a camera device on the gimbal does not rotate as a holder rotates, and the follow mode means that the camera device on the gimbal rotates as the holder rotates.

8. The gimbal handheld holder, as recited in claim 5, wherein the at least one rocker potentiometer and a second switch are located on a same PCB (printed circuit board).

9. The gimbal handheld holder, as recited in claim 6, wherein the at least one rocker potentiometer and a second switch are located on a same PCB (printed circuit board).

10. The gimbal handheld holder, as recited in claim 7, wherein the at least one rocker potentiometer and a second switch are located on a same PCB (printed circuit board).

11. The gimbal handheld holder, as recited in claim 1, further comprising a gimbal plug board, wherein the gimbal plug board is located within the handle, and the handheld holder main control board is electrically connected with the main control board of the gimbal through the gimbal plug board.

12. The gimbal handheld holder, as recited in claim 1, wherein the handheld holder main control board converts the electrical signals into the PWM signals through filtering and angle conversion.

13. The gimbal handheld holder, as recited in claim 4, wherein the handheld holder main control board converts the electrical signals into the PWM signals through filtering and angle conversion.

14. A gimbal system, comprising a gimbal handheld holder and a gimbal; wherein:
   the gimbal handheld holder comprises two support legs and a control device, a transverse rod is located between the two support legs, a handle is located on the transverse rod, a gimbal connector is located at a junction of the handle with the transverse rod, the gimbal handheld holder is connected with the gimbal through the gimbal connector, the gimbal is located below the transverse rod and between the two support legs, and the control device controls the gimbal to move;
   the control device comprises a handheld holder main control board and at least one rocker potentiometer; the handheld holder main control board is located within the handle; the at least one rocker potentiometer, located on one of the two support legs, receives operation instructions and sends electrical signals to the handheld holder main control board; the handheld holder main control board converts the electrical signals into PWM (pulse width modulation) signals and sends the PWM signals to a main control board of the gimbal; and the main control board controls the gimbal to rotate according to the PWM signals.

* * * * *